United States Patent
Cardona et al.

(10) Patent No.: US 9,178,839 B2
(45) Date of Patent: Nov. 3, 2015

(54) SHARING BUFFER SPACE IN LINK AGGREGATION CONFIGURATIONS

(75) Inventors: Omar Cardona, Austin, TX (US); James B. Cunningham, Austin, TX (US); Baltazar De Leon, III, Austin, TX (US); Jeffrey P. Messing, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 12/179,242

(22) Filed: Jul. 24, 2008

(65) Prior Publication Data

US 2010/0020818 A1   Jan. 28, 2010

(51) Int. Cl.
  *H04L 12/861*  (2013.01)
  *H04L 12/891*  (2013.01)

(52) U.S. Cl.
  CPC .......... *H04L 49/9036* (2013.01); *H04L 47/41* (2013.01); *H04L 49/90* (2013.01); *Y02B 60/33* (2013.01)

(58) Field of Classification Search
  CPC ..... H04L 47/41; H04L 49/9036; H04L 49/90; Y02B 60/33
  See application file for complete search history.

(56) References Cited

U.S. PATENT DOCUMENTS

| | | | |
|---|---|---|---|
| 6,366,583 B2 | 4/2002 | Rowett et al. | |
| 7,099,276 B1 | 8/2006 | Kalkunte et al. | |
| 7,197,044 B1 | 3/2007 | Kadambi et al. | |
| 7,352,760 B2 | 4/2008 | Wyatt et al. | |
| 2005/0091307 A1* | 4/2005 | Venkatsubra et al. | 709/203 |
| 2007/0147238 A1 | 6/2007 | Kadambi et al. | |
| 2007/0183313 A1* | 8/2007 | Narayanan et al. | 370/216 |
| 2007/0239905 A1* | 10/2007 | Banerjee et al. | 710/22 |
| 2007/0280208 A1* | 12/2007 | Smith et al. | 370/356 |

* cited by examiner

*Primary Examiner* — Jianye Wu
(74) *Attorney, Agent, or Firm* — DeLizio Law, PLLC

(57) ABSTRACT

In link aggregation configurations, a data packet may be copied into a buffer space of a first NIC. Load balancing techniques may determine that the packet should be transmitted by a second NIC. The packet exists in memory that the second NIC cannot access. The data packet is copied into memory accessible to the second NIC or the memory location of the packet is registered with the NIC. A copy penalty is incurred if a packet is copied from a first buffer space to a second buffer space. A registration penalty is incurred if the location within the first buffer space is registered with the second NIC. Functionality can be implemented within a link aggregation configuration to register buffer space shared among interconnected NICs. Sharing of buffer space between interconnected NICs allows any one of the NICs to access data within the shared buffer space without incurring a penalty.

14 Claims, 5 Drawing Sheets

SHARING BUFFER SPACE IN LINK AGGREGATION CONFIGURATIONS

BACKGROUND

Embodiments of the inventive subject matter generally relate to the field of networking, and, more particularly, to sharing buffer space in link aggregation configurations.

Link aggregation configurations, such as 802.3ad, increase network throughput on a server by interconnecting multiple network interface cards (NICs). If there is a number N of interconnected NICs on a server, the server can transmit N data packets simultaneously. Although transmit time is reduced by a factor of N, central processing unit (CPU) usage is not reduced for link aggregation configurations as compared to the number N of independent interfaces.

An operating system uses one of two techniques to pass packets to be transmitted to an interface. The first technique is to copy data packets into memory locations that have been pre-registered as buffer space for the interface. Pre-registration of buffer space occurs when the operating system configures the interface at startup. Pre-registration of buffer space comprises allocating a block of memory to the interface to allow direct memory access (DMA) to the data packets. The second technique is to register the memory location of the packet on-the-fly with the interface. Instead of setting up a block of memory for the interface to access at startup, the operating system allocates the memory as needed. The allocation of memory is usually temporary and each packet memory location is registered on-the-fly.

Once the memory is registered, the packet data is retrieved by DMA. For example, an operating system may pass down a packet to a first NIC in a link aggregation configuration, but load balancing techniques for the configuration may determine that the packet should be transmitted by a second NIC instead of the first NIC. The packet is either copied from the buffer space of the first NIC to the buffer space of the second NIC, or the location in the buffer space of the first NIC must be DMA registered with the second NIC on-the-fly.

SUMMARY

Embodiments include a method directed to determining that a first network interface card is to be aggregated with at least a second network interface card into a link aggregation configuration. A first buffer space allocated by an operating system to the first network interface card is determined. A shared buffer space from the first buffer space and a second buffer space that was allocated by the operating system to the second network interface card is created. The shared buffer space is shared by the first and the second network interfaces cards for accessing outgoing data packets.

BRIEF DESCRIPTION OF THE SEVERAL DRAWINGS

The present embodiments may be better understood, and numerous objects, features, and advantages made apparent to those skilled in the art by referencing the accompanying drawings.

FIG. 3 is a flowchart depicting operations that continue from the flowchart depicted by FIG. 2.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to 802.3ad, embodiments can be implemented in other link aggregation configurations. In other instances, well-known instruction instances, protocols, structures and techniques have not been shown in detail in order not to obfuscate the description.

Link aggregation configurations increase network throughput or bandwidth on a server. In link aggregation configurations, a data packet may be copied into a buffer space of a first NIC. Load balancing techniques may determine that the packet should be transmitted by a second NIC. However, the packet does not exist in memory that the second NIC can access. The data packet is either copied into memory the second NIC can access or the memory location of the packet is registered on-the-fly with the NIC. If a packet is copied from the buffer space of the first NIC to the buffer space of the second NIC, the system incurs a copy penalty. If the memory location within the buffer space of the first NIC is registered on-the-fly with the second NIC, the system incurs a DMA registration penalty. Functionality can be implemented within a link aggregation configuration to register buffer space shared among a plurality of interconnected NICs. Sharing of buffer space between the plurality of NICs allows any one of the NICs to access and transmit data within the shared buffer space without incurring a penalty, such as a copy or DMA registration penalty.

Figure 1:
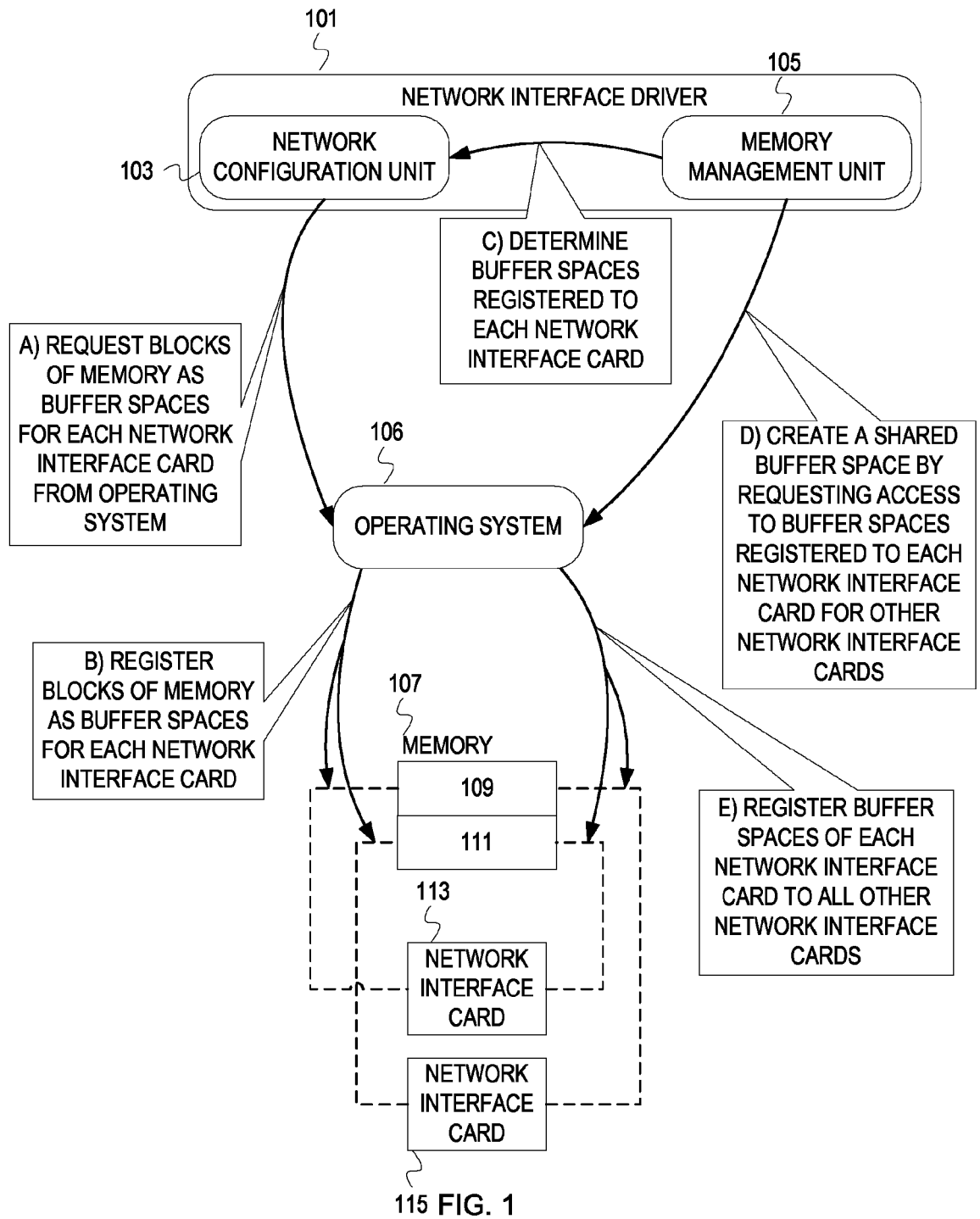
FIG. 1 depicts an example conceptual diagram of creating a shared buffer space for a link aggregation configuration.

FIG. 1 depicts an example conceptual diagram of creating a shared buffer space for a link aggregation configuration. A link aggregation configuration comprises a plurality of network interface cards configured to transmit and receive data as an aggregate. An operating system considers NICs in a link aggregation configuration as one network interface. A link aggregation configuration is not limited to a n:1 configuration, though. For instance, eight network interface cards can be aggregated to be used as two or three different links (e.g., each of two links can be derived by aggregating three NICs and a third link can be derived from aggregating two NICs). As illustrated in FIG. 1, a server comprises a network interface driver 101, a memory 107, an operating system 106 and network interface cards 113 and 115. The network interface driver 101 comprises a network configuration unit 103 and a memory management unit 105.

At stage A, the network configuration unit 103 requests blocks of memory to be used as buffer spaces for NICs 113 and 115 from the operating system 106 at system startup. A block of memory comprises a set of memory locations. One or more locations in memory can be used as buffer space for a NIC. The aggregation of one or more memory locations can be shared among a plurality of NICs. If the aggregate of memory locations is viewed as a buffer space, then the NICs share the buffer space.

At stage B, the operating system 106 registers blocks of memory as buffer spaces to NICs 113 and 115. Buffer space 109 is registered to NIC 113 and buffer space 111 is registered to NIC 115 by the operating system 106. NIC 113 can now access data in buffer space 109 and NIC 115 can access data in buffer space 111. The operating system 106 uses buffer space 109 and buffer space 111 to pass packets to be transmitted to NIC 113 and NIC 115 respectively. In some embodiments, NICs in a link aggregation configuration are of the same type (e.g., brand, model, etc.). In other embodiments, NICs in a link aggregation configuration may be of different types.

At stage C, the memory management unit 105 determines which buffer spaces were registered to NIC 113 and NIC 115. At stage D, the memory management unit 105 creates a shared buffer space. Creating a shared buffer space comprises requesting access to buffer space 109 by NIC 115 and access to buffer space 111 by NIC 113 from the operating system 106.

At stage E, the operating system registers the buffer spaces of each NIC to all other NICs. Buffer space 109 was previously registered to NIC 113 and is now registered to NICs 113 and 115. Similarly, buffer space 111 was previously registered to NIC 115 and is now registered to NICs 113 and 115. NIC 113 can now access the buffer space 111 and NIC 115 can access the buffer space 109. Buffer spaces 109 and 111 comprise a shared buffer space for NICs 113 and 115.

In some embodiments, unique blocks of memory are registered to individual NICs. For example, two separate 1 megabyte blocks are registered to two unique NICs. When the memory is mapped between the two interconnected NICs, a 2 megabyte shared buffer space is created. Note that the separate 1 megabyte blocks may or may not be contiguous. In addition, a NIC may have more than one registered buffer space. In other embodiments, the same block of memory is registered to more than one NIC. For example, a 1 megabyte block of memory is registered to three NICs. Since the same memory block is registered with each NIC, the memory is not mapped between NICs. The total shared buffer space between the three NICs is 1 megabyte. Note that data in the shared buffer space comprises packets to be transmitted by one of the three NICs. The NICs do not have write privileges to the shared buffer space since data packets are deposited by the operating system for transmit. Data packets received by the NICs are not copied into the shared buffer space. Separate memory blocks are maintained for incoming data packets received by the NICs.

Although examples refer to start up and addition of a network interface, embodiments are not so limited. After startup, existing network interface cards can be configured for link aggregation and/or an additional network interface card can be added to already aggregated network interface cards. During configuration, the shared buffer space can be created. For instance, an existing configuration command can be modified to cause the cross registration of buffers spaces for a shared buffer space. As another example, a new configure command can be created to initiate creation of the shared buffer space.

In addition, embodiments are not limited to a single driver or process obtaining buffer space information to create the shared buffer space across multiple network interface cards. For instance, the individual network interface drivers for the network interface cards can be implemented with functionality to communicate information about their buffer spaces to each other, and to create the shared buffer space. Embodiments can also designate one of the plurality of network interface card drivers to maintain information about the shared buffer space and assign that network interface card drive the task(s) of communicating information for the shared buffer space (e.g., additional space, new boundaries, available space, reduced space, etc.) to the other network interface drivers.

Figure 2:
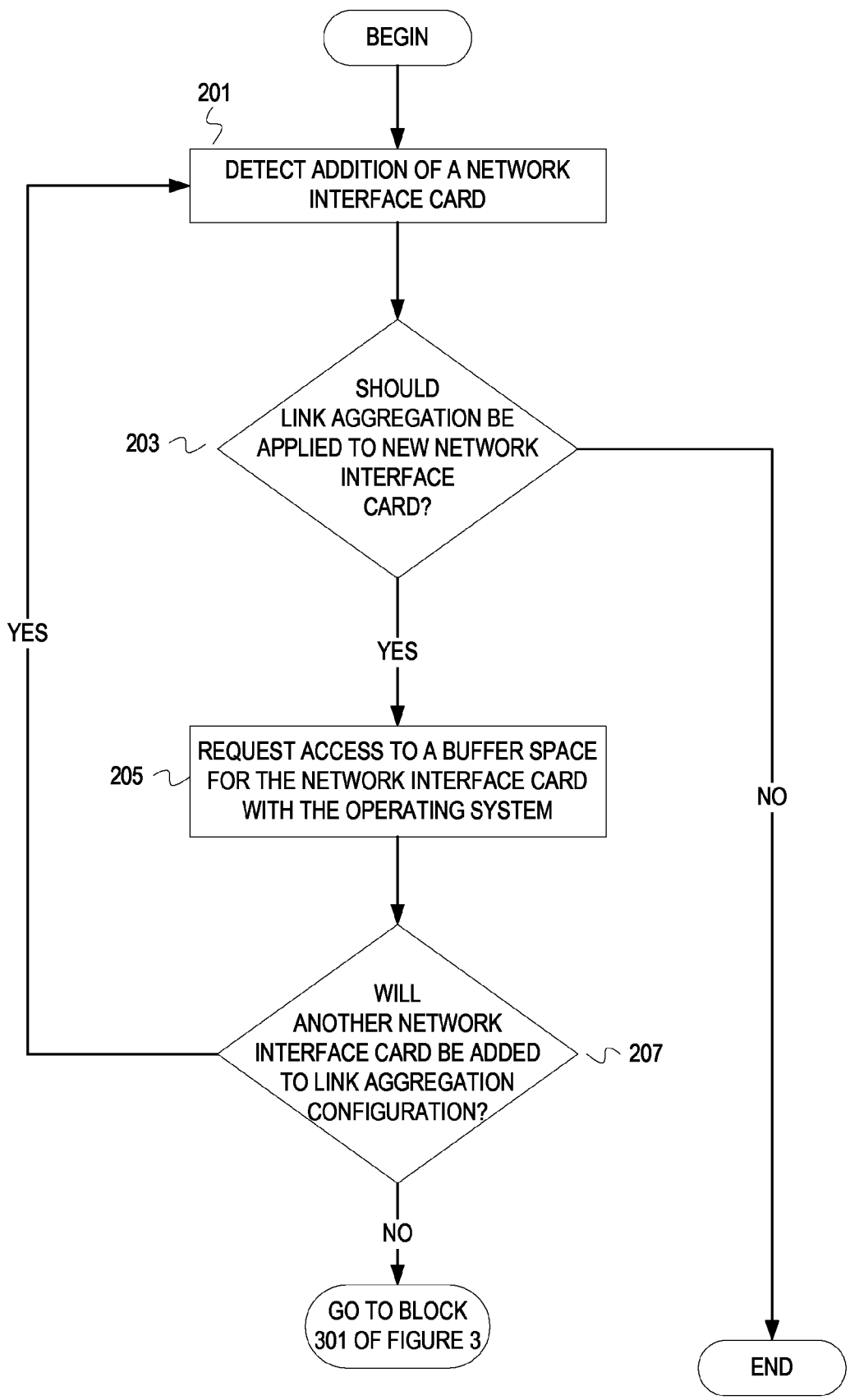
FIGS. 2-3 depict a flowchart of example operations for link aggregation configuration.
Figure 3:
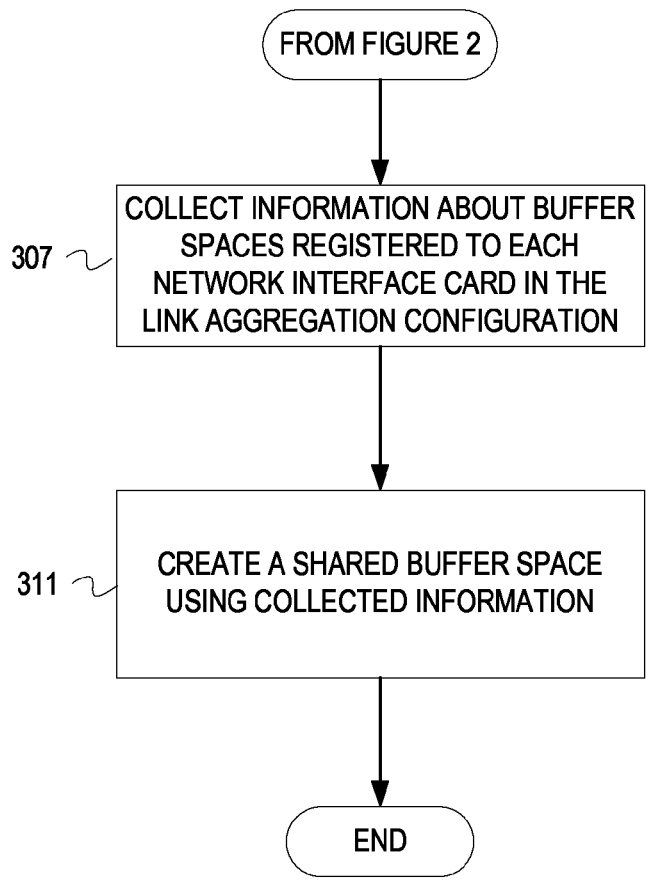

FIGS. 2-3 depict a flowchart of example operations for link aggregation configuration. Flow begins at block 201, where the addition of a network interface card is detected. Examples of detecting the addition of a new network interface card include detecting power-up of a NIC, detecting initialization of a NIC, etc.

At block 203, it is determined if a link aggregation should be applied to the new NIC. If link aggregation should be applied to the NIC, flow continues at block 205. If link aggregation should not be applied to the NIC, flow ends.

At block 205, access to a buffer space is requested from the operating system for the NIC. Then, the operating system or NIC driver allocates the block of memory and records the allocation in a registry. The block of memory is considered to be the buffer space for the NIC and the operating system uses the buffer space to deposit outgoing data packets. For example, a link aggregation driver executes a driver buffer registration function for a NIC at input/output control time (IOCTRL) time. The driver buffer registration function requests a block of memory for a buffer space from an operating system. The operating system returns starting addresses and lengths of the registered buffer spaces and records the address and length information in the registry. The driver buffer registration function populates a memory registration structure corresponding to the NIC with the address and length information of the buffer space.

At block 207, it is determined if another NIC will be added to the link aggregation configuration. In this embodiment, the NICs are added to the link aggregation configuration as they are detected. The number of NICs and which NICs will participate in the link aggregation configuration has been indicated. For example, information has been stored by the operating system about a link aggregation configuration that was operating while the system was previously online. At startup, the system configures the NICs as they were configured the last time the system was online. In other embodiments, NICs are configured as independent interfaces and are grouped into a link aggregation configuration at a later time. For example, a network administrator connects five NICs to a server. The server automatically configures the NICs as five independent network interfaces. The network administrator indicates that the five NICs comprise a link aggregation configuration. The operating system aggregates the five NICs into one network interface. If another NIC will not be added to the link aggregation configuration, flow returns to block 201. If another NIC will be added to the link aggregation configuration, flow continues at block 307 of FIG. 3.

FIG. 3 is a flowchart depicting operations that continue from the flowchart depicted by FIG. 2. At block 307, information about the buffer spaces registered to each NIC in the link aggregation configuration is collected. For example, addresses and lengths of buffer spaces may be collected by obtaining and/or accessing the memory registration structure for each NIC.

At block 311, shared buffer space is created using the collected information. For instance, the link aggregation driver requests access to the registered buffer spaces for every NIC in the link aggregation configuration from the operating system. The operating system records in the registry access privileges for each NIC to the buffer spaces registered to the other NICs in the link aggregation configuration. For example, a link aggregation configuration comprises three NICs. The link aggregation driver calls a buffer registration function of the first NIC with addresses and lengths of the buffer spaces registered to the second NIC and third NIC. The link aggregation driver uses the buffer registration function to request read privileges for the first NIC to the memory blocks that are buffer spaces for the second and third NICs. The operating system records the read privileges to the memory blocks in the registry. The link aggregation driver calls a buffer registration function for the second NIC with buffer space information for the first and third NICs. Similarly, the link aggregation driver calls a buffer registration function of the third NIC with buffer space information for the first and second NICs. A link aggregation configuration may comprise NICs of different type (e.g., different manufacturers, different protocol versions, different protocols, etc.), so different buffer registration functions may be called.

Figure 4:
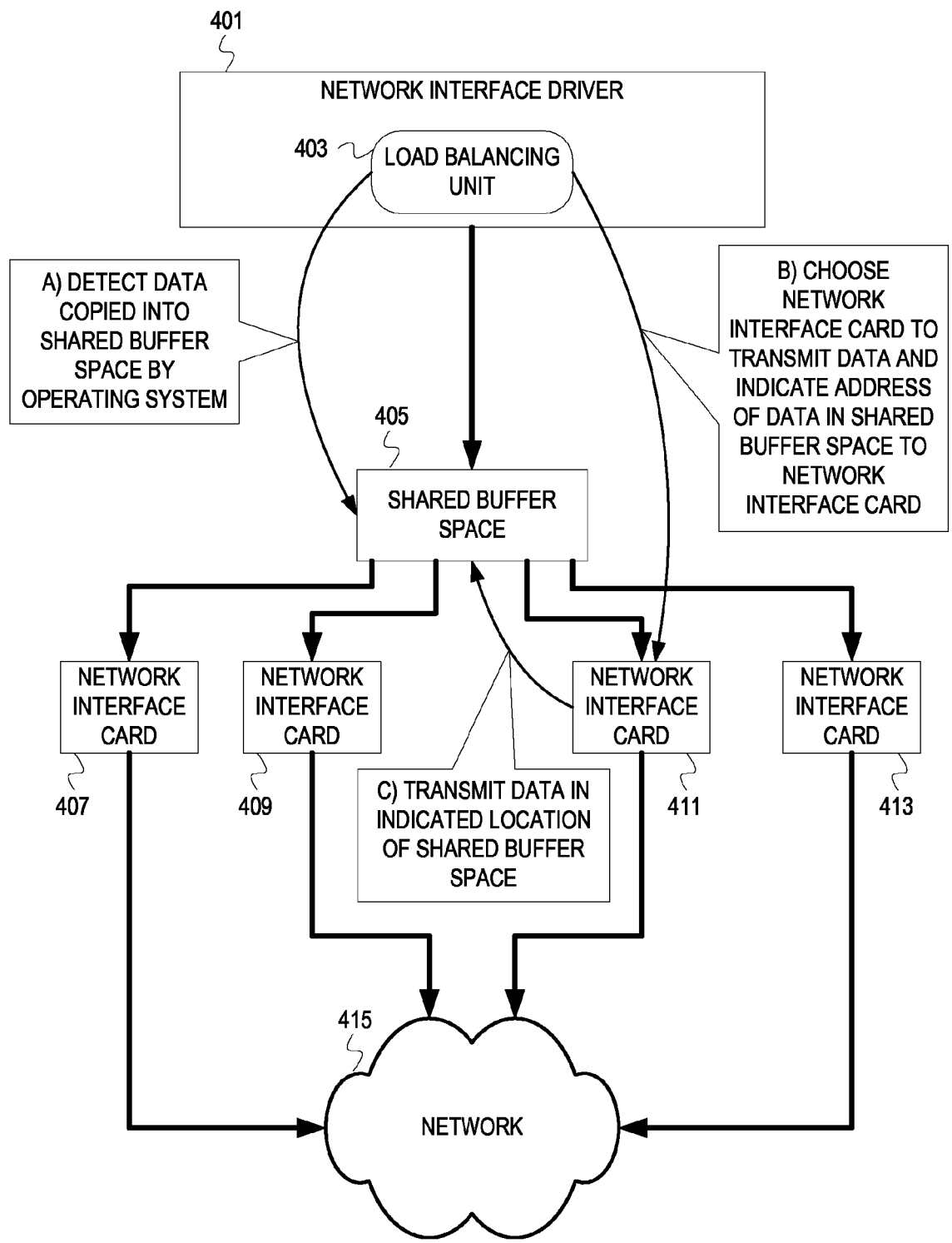
FIG. 4 depicts an example link aggregation configuration.

In this embodiment, functionality to configure link aggregation is implemented in a link aggregation driver. In other embodiments, functionality to configure link aggregation may be implemented in the operating system. Once the shared buffer space has been created for NICs in the link aggregation configuration of a network interface, the network interface can begin transmitting data. FIG. 4 depicts an example link aggregation configuration. The link aggregation configuration comprises a network interface driver 401, a NIC 407, a NIC 409, a NIC 411 and a NIC 413. The network interface driver 401 comprises a load balancing unit 403. A shared buffer space 405 is registered to NIC 407, NIC 409, NIC 411 and NIC 413. NIC 407, NIC 409, NIC 411 and NIC 413 are connected to a network 415.

At stage A, the load balancing unit 403 detects data copied into the shared buffer space by the operating system. The operating system may write data to any address within the shared buffer space providing that it does not overwrite data that has not yet been transmitted. Each NIC can access the entire shared buffer space eliminating the need for DMA registration of a packet memory location on-the-fly or copying a packet from one buffer space to another.

At stage B, the load balancing unit 403 chooses which NIC to transmit the data and indicates an address of the data in the shared buffer space to the NIC. NIC 411 has been chosen to transmit the data. Methods for choosing the NIC to transmit the data include round robin, random choice, etc.

At stage C, the NIC 411 transmits the data in indicated location of shared buffer space.

It should be understood that the depicted flowcharts are examples meant to aid in understanding embodiments and should not be used to limit embodiments or limit scope of the claims. Embodiments may perform additional operations, fewer operations, operations in a different order, operations in parallel, and some operations differently. For instance, referring to FIGS. 2-3, embodiments may register the same memory block for each NIC. If the same buffer space has been registered for each NIC in the link aggregation configuration, the operations for mapping buffer spaces between a new NIC and any additional NICs in the network are not performed.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). Examples of a machine-readable storage medium may include, but are not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in a machine-readable signal propagation medium, such as an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
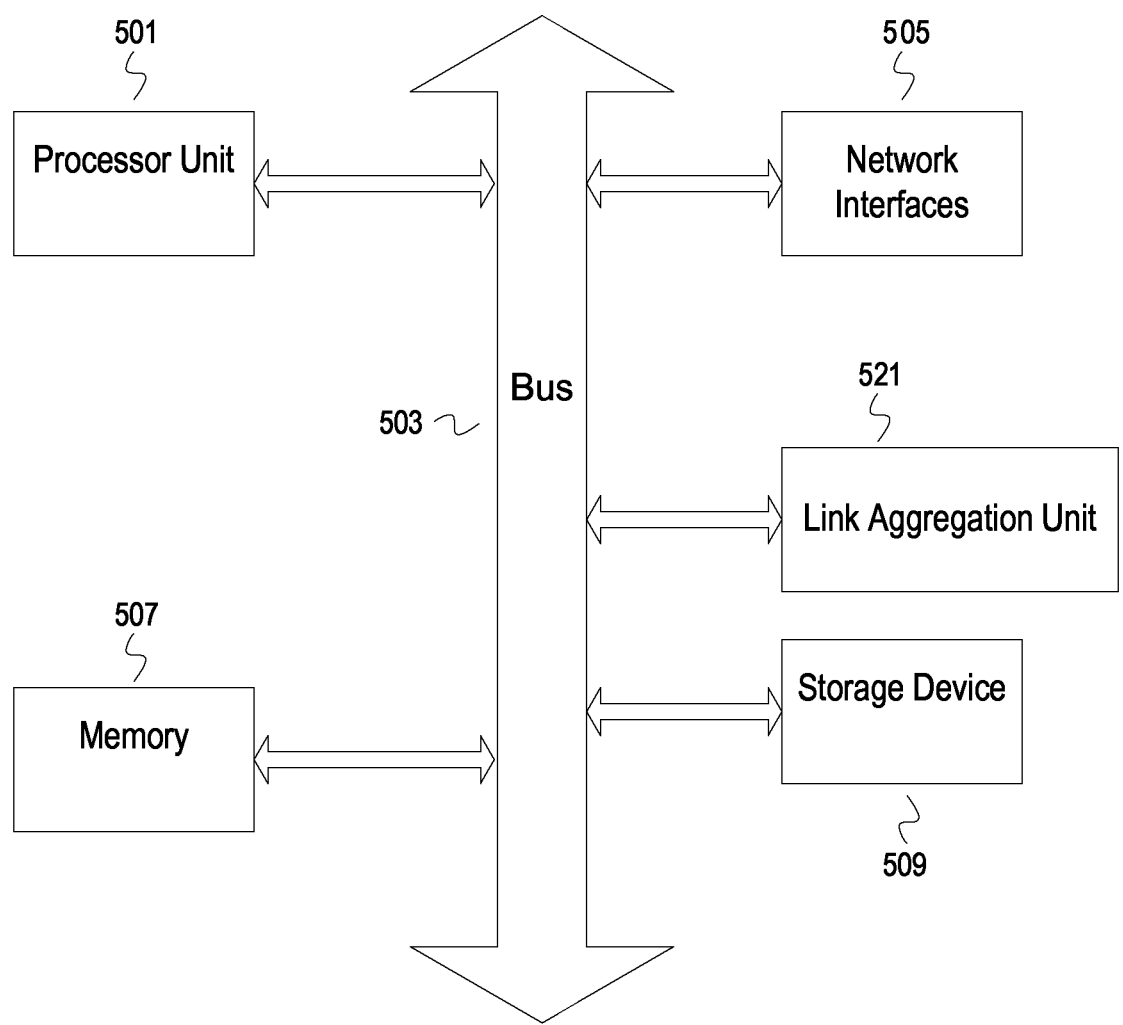
FIG. 5 depicts an example computer system.

FIG. 5 depicts an example computer system. A computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The computer system also includes a link aggregation unit 521 that registers buffer space between NICs in a link aggregation configuration. Any one of the above described functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

While the embodiments are described with reference to various implementations and exploitations, it will be understood that these embodiments are illustrative and that the scope of the inventive subject matter is not limited to them. In general, techniques for sharing buffer space in link aggregation configurations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
    determining that a first network interface card is to be aggregated with at least a second network interface card into a link aggregation configuration;
    in response to said determining that the first network interface card is to be aggregated with at least the second network interface card into the link aggregation configuration,
        determining a first buffer space allocated by an operating system to the first network interface card; and
        creating a shared buffer space from the first buffer space and a second buffer space that was allocated by the operating system to the second network interface card, wherein said creating the shared buffer space comprises,
            updating a registry to allow the first network interface card read access to both the first buffer space and the second buffer space and to allow the second network interface card read access to both the first buffer space and the second buffer space;
            indicating the first buffer space to the second network interface card and the second buffer space to the first network interface card, wherein the first network interface card and the second network interface card transmit data read from the shared buffer space.

2. The method of claim 1, wherein said determining that the first network interface card is to be aggregated with at least the second network interface card into the link aggregation configuration occurs coincident with one or more of initialization of the first network interface card, start up of the operating system, execution of a configuration command to aggregate the first network interface card with the second network interface card, and installation of the first network interface card.

3. The method of claim 1, wherein said indicating the first buffer space to the second network interface card and the second buffer space to the first network interface card comprises:
    populating a first memory registration structure of the first network interface card with address and length information of the second buffer space, wherein the first memory registration structure was previously populated with address and length information of the first buffer space; and
    populating a second memory registration structure of the second network interface card with address and length information of the first buffer space, wherein the second memory registration structure was previously populated with the address and length information of the second buffer.

4. The method of claim 3, wherein at least one executing instance of a network interface driver performs said populating the first memory registration structure and said populating the second memory registration structure, and the operating system performs said updating the registry.

5. The method of claim 1, wherein said updating the registry to allow the first network interface card read access to both the first buffer space and the second buffer space and to allow the second network interface card read access to both the first buffer space and the second buffer space comprises:
    recording in the registry a first read access privilege indication for the first network interface with address and length information that identifies the second buffer; and
    recording in the registry a second read access privilege indication for the second network interface with address and length information that identifies the first buffer space,
    wherein a third access privilege indication was previously recorded in the registry for the first network interface with the address and length information that identifies the first buffer space and a fourth privilege indication was previously record in the registry for the second network interface with the address and length information that identifies the second buffer space.

6. The method of claim 1 further comprising determining the second buffer space that was allocated to the second network interface card.

7. The method of claim 1 further comprising:
    selecting one of the aggregated first network interface card and the second network interface card to transmit a set of one or more data packets from the shared buffer space;
    indicating one or more locations of the set of one or more data packets in the shared buffer space to the selected one of the first and second network interface cards; and
    the selected one of the first network interface card and the second interface card reading the set of data packets from the shared buffer space.

8. A computer program product for creating a shared buffer space across a plurality of network interface cards, the computer program product comprising:
    a computer readable storage device having computer usable program code embodied therewith, the computer usable program code executable by a processor to cause the processor to perform operations comprising:
    determining that a first network interface card is to be aggregated with at least a second network interface card into a link aggregation configuration;
    in response to said determining that the first network interface card is to be aggregated with at least the second network interface card into the link aggregation configuration,
        determining a first buffer space allocated by an operating system to the first network interface card; and
        creating a shared buffer space from the first buffer space and a second buffer space that was allocated by the operating system to the second network interface card wherein said creating the shared buffer space comprises,
            updating a registry to allow the first network interface card read access to both the first buffer space and the second buffer space and to allow the second network interface card read access to both the first buffer space and the second buffer space;

indicating the first buffer space to the second network interface card and the second buffer space to the first network interface card.

9. The computer program product of claim 8, wherein said operation of determining that the first network interface card is to be aggregated with at least the second network interface card into the link aggregation configuration occurs coincident with one or more of initialization of the first network interface card, start up of the operating system, execution of a configuration command to aggregate the first network interface card with the second network interface card, and installation of the first network interface card.

10. The computer program product of claim 8, wherein said operation of indicating the first buffer space to the second network interface card and the second buffer space to the first network interface card comprises:

populating a first memory registration structure of the first network interface card with address and length information of the second buffer space, wherein the first memory registration structure was previously populated with address and length information of the first buffer space; and populating a second memory registration structure of the second network interface card with address and length information of the first buffer space, wherein the second memory registration structure was previously populated with the address and length information of the second buffer.

11. The computer program product of claim 8, wherein said operation of updating the registry to allow the first network interface card read access to both the first buffer space and the second buffer space and to allow the second network interface card read access to both the first buffer space and the second buffer space comprises:

recording in the registry a first read access privilege indication for the first network interface with address and length information that identifies the second buffer; and recording in the registry a second read access privilege indication for the second network interface with address and length information that identifies the first buffer space, wherein a third access privilege indication was previously recorded in the registry for the first network interface with the address and length information that identifies the first buffer space and a fourth privilege indication was previously record in the registry for the second network interface with the address and length information that identifies the second buffer space.

12. The computer program product of claim 8, wherein the operations further comprise:

selecting one of the aggregated first network interface card and the second network interface card to transmit a set of one or more data packets from the shared buffer space;

indicating one or more locations of the set of one or more data packets in the shared buffer space to the selected one of the first and second network interface cards; and the selected one of the first network interface card and the second interface card reading the set of data packets from the shared buffer space.

13. An apparatus comprising:
a set of one or more processing units;
a plurality of network interface cards;
a memory; and
a link aggregation unit to, determine that a first of the plurality of network interface cards is to be aggregated with at least a second of the plurality of network interface cards into a link aggregation configuration;

in response to determining that the first network interface card is to be aggregated with at least the second network interface card into the link aggregation configuration, determine a first buffer space allocated from the memory by an operating system to the first network interface card; and create a shared buffer space from the first buffer space and a second buffer space, wherein the second buffer space was allocated from the memory by the operating system to the second network interface card, wherein the link aggregation unit to create the shared buffer space comprises the link aggregation unit being configured to, update a registry to allow the first network interface card read access to both the first buffer space and the second buffer space and to allow the second network interface card read access to both the first buffer space and the second buffer space;

indicate the first buffer space to the second network interface card and the second buffer space to the first network interface card, wherein the first network interface card and the second network interface card transmit data read from the shared buffer space.

14. The apparatus of claim 13, wherein the link aggregation unit to indicate the first buffer space to the second network interface card and the second buffer space to the first network interface card comprises the link aggregation unit to:

populate a first memory registration structure of the first network interface card with address and length information of the second buffer space, wherein the first memory registration structure was previously populated with address and length information of the first buffer space; and populate a second memory registration structure of the second network interface card with address and length information of the first buffer space, wherein the second memory registration structure was previously populated with the address and length information of the second buffer.

* * * * *